US011971002B2

United States Patent
Asai (10) Patent No.: US 11,971,002 B2
(45) Date of Patent: Apr. 30, 2024

(54) VEHICLE ELECTRICAL POWER SYSTEM WITH DEFECT DETECTION

(71) Applicant: DENSO CORPORATION, Kariya (JP)

(72) Inventor: Ryouta Asai, Kariya (JP)

(73) Assignee: DENSO CORPORATION, Kariya (JP)

( * ) Notice: Subject to any disclaimer, the term of this patent is extended or adjusted under 35 U.S.C. 154(b) by 247 days.

(21) Appl. No.: 17/509,771

(22) Filed: Oct. 25, 2021

(65) Prior Publication Data
US 2022/0042486 A1 Feb. 10, 2022

Related U.S. Application Data

(63) Continuation of application No. PCT/JP2020/020557, filed on May 25, 2020.

(30) Foreign Application Priority Data

Jun. 11, 2019 (JP) .................. 2019-108680

(51) Int. Cl.
*F02N 11/00* (2006.01)
*B60R 16/02* (2006.01)
(Continued)

(52) U.S. Cl.
CPC ............ *F02N 11/108* (2013.01); *B60R 16/02* (2013.01); *B60R 16/033* (2013.01);
(Continued)

(58) Field of Classification Search
CPC ................................ B60R 16/02; F02N 11/108
See application file for complete search history.

(56) References Cited

U.S. PATENT DOCUMENTS 5,200,877 A * 4/1993 Betton .................... H02J 9/002
307/10.7
5,381,295 A * 1/1995 Rund .................... H02J 7/0031
361/72
(Continued)

FOREIGN PATENT DOCUMENTS

JP 10136503 A * 5/1998
JP 2005088676 A 4/2005
(Continued)

OTHER PUBLICATIONS

Patent Cooperation Treaty, Jun. 30, 2020, English translation of the Written Opinion of the International Searching Authority, PCT/JP2020/020557, (Year: 2020).*

*Primary Examiner* — Adi Amrany
(74) *Attorney, Agent, or Firm* — Harness, Dickey & Pierce, P.L.C.

(57) ABSTRACT

A vehicular apparatus receiving power from a battery mounted on a vehicle includes a main controller unit, a defect detection unit, and an operation controller unit. The operation controller unit is configured to turn off an operation of a target device among a plurality of devices controlled by the main controller unit in response to an occurrence of a voltage drop in which the voltage from the battery is equal to or lower than a predetermined threshold value. In response to turning off the operation of the target device due to the voltage drop, the operation controller unit is configured to transmit a notification indicating turning off of the operation of the target device to the defect detection unit. Upon receiving the notification, the defect detection unit is configured to cancel a determination of a defect relative to the target device.

7 Claims, 10 Drawing Sheets

(51) Int. Cl.
*B60R 16/033* (2006.01)
*F02N 11/08* (2006.01)
*F02N 11/10* (2006.01)
*H02J 7/00* (2006.01)

(52) U.S. Cl.
CPC ........ *F02N 11/0866* (2013.01); *F02N 11/106* (2013.01); *H02J 7/00* (2013.01); *F02N 2200/063* (2013.01); *F02N 2250/02* (2013.01)

(56) References Cited

U.S. PATENT DOCUMENTS

| | | | |
|---|---|---|---|
| 6,615,119 B1 * | 9/2003 | Shimizu | G01M 15/05 |
| | | | 73/114.61 |
| 2013/0096769 A1 | 4/2013 | Kawamura et al. | |
| 2016/0036371 A1 * | 2/2016 | Yamasaki | B62D 5/046 |
| | | | 318/400.22 |
| 2020/0043068 A1 * | 2/2020 | McQuade | G06Q 30/08 |
| 2020/0148144 A1 | 5/2020 | Shiomi | |

FOREIGN PATENT DOCUMENTS

| | | | |
|---|---|---|---|
| JP | 2013086525 A | 5/2013 | |
| JP | 2019018844 A | 2/2019 | |

* cited by examiner

VEHICLE ELECTRICAL POWER SYSTEM WITH DEFECT DETECTION

CROSS REFERENCE TO RELATED APPLICATIONS

The present application is a continuation application of International Patent Application No. PCT/JP2020/020557 filed on May 25, 2020, which designated the U.S. and claims the benefit of priority from Japanese Patent Application No. 2019-108680 filed on Jun. 11, 2019. The entire disclosures of all of the above applications are incorporated herein by reference.

TECHNICAL FIELD

The present disclosure relates to a vehicular apparatus.

BACKGROUND

There is recently a vehicular apparatus for displaying information by arranging a display inside a meter in a vehicle, or replacing the entire meter with a display to display graphically the speed and the like. There is also a vehicular apparatus provided with a display for displaying so-called multimedia information such as a navigation window. Further, there is disclosed a vehicular apparatus that integrates a plurality of functions such as displaying the meter and displaying the multimedia information. Hereinafter, a vehicular apparatus integrating a plurality of functions will be referred to as an integrated vehicular apparatus for convenience.

The vehicular apparatus is supplied with power from a battery mounted on the vehicle. It is known that such a battery provides a voltage that becomes temporarily lower than the rated voltage because the current consumption increases to drive the starter motor when the engine is started. Hereinafter, the period during which the voltage from the battery temporarily drops is referred to as a cranking period.

SUMMARY

According to an example of the present disclosure, a vehicular apparatus receiving power from a battery mounted on a vehicle is provided to include a main controller unit, a defect detection unit, and an operation controller unit. The operation controller unit is configured to turn off an operation of a target device among a plurality of devices controlled by the main controller unit in response to an occurrence of a voltage drop in which the voltage from the battery is equal to or lower than a predetermined threshold value. In response to turning off the operation of the target device due to the voltage drop, the operation controller unit is configured to transmit a notification indicating turning off of the operation of the target device to the defect detection unit. Upon receiving the notification, the defect detection unit is configured to cancel a determination of a defect relative to the target device.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, a plurality of embodiments will be described with reference to the drawings. Further, the configurations that are substantially common in each embodiment will be described with the same reference numerals.

First Embodiment

Figure 1:
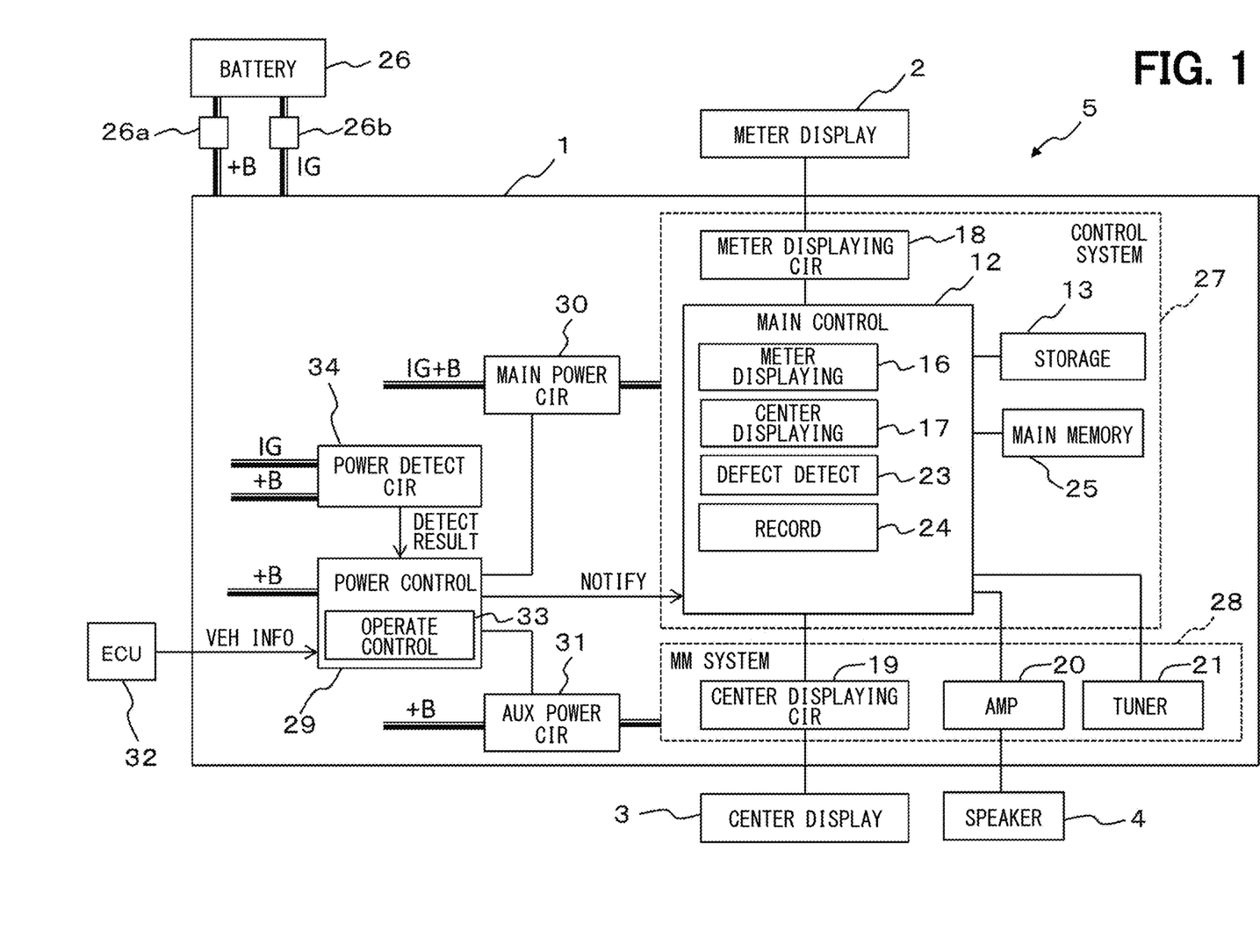
FIG. 1 is a diagram schematically showing a configuration of a vehicular apparatus according to a first embodiment.

Hereinafter, a first embodiment will be described. As shown in FIG. 1, the vehicular apparatus 1 is connected to a display such as a meter display 2 and a center display 3. As will be described later, these displays are configured to display necessary information for the vehicle to travel, such as a navigation screen image, a menu screen image, and the like. However, the configuration of the display is an example; there is no need to be limited thereto. Further, the vehicular apparatus 1 is also connected to, for example, a speaker 4 which can play music. The vehicular apparatus 1 is included in a cockpit system that realizes so-called vehicle infotainment.

Figure 2:
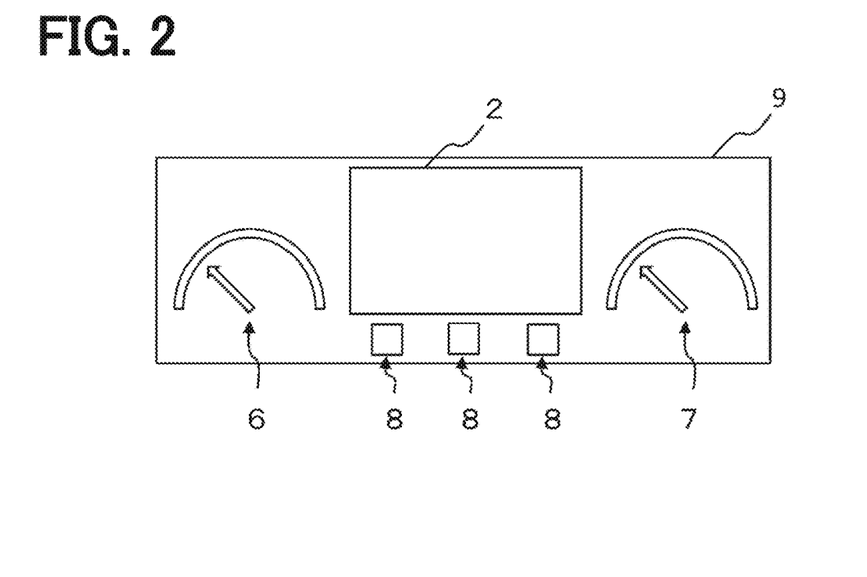
FIG. 2 is a diagram schematically showing a configuration of a meter display.

The meter display 2 is composed of, for example, a liquid crystal display or an organic EL display, and is provided adjacent to the front of the driver. More specifically, as shown in FIG. 2, the meter display 2 is arranged at the center of the meter panel 9 provided with a speedometer 6, a rotation speed meter 7, various warning lights 8, and the like. Note that the meter display 2 may be configured such that the entire meter panel 9 is composed of a display, and the speedometer 6, the rotation speed meter 7, the warning light 8, and the like are also displayed in full graphic.

Figure 3:
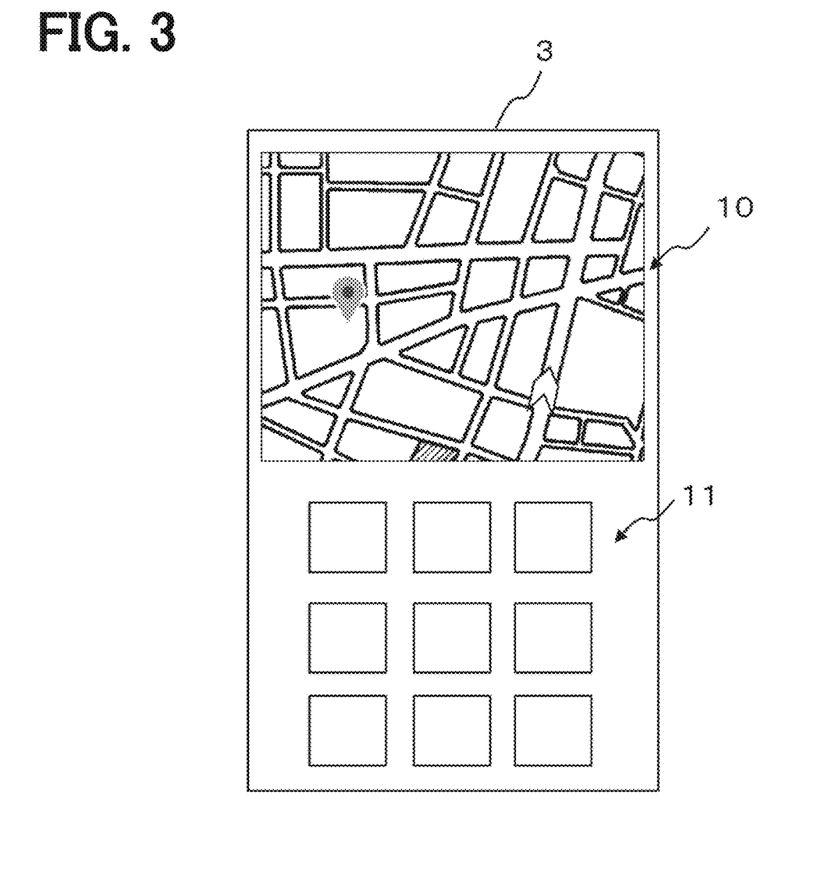
FIG. 3 is a diagram schematically showing a configuration of a center display.

The center display 3 is composed of, for example, a liquid crystal display or an organic EL display, and is arranged to be adjacent to a so-called center console. As shown in FIG. 3, the center display 3 displays, for example, a navigation screen image 10 or a menu screen image 11. Further, the center display 3 can also display a television broadcast, a music reproduction screen image, or the like. Further, in the vehicular apparatus 1, the center display 3 and the meter display 2 can display images seamlessly to each other, and for example, the navigation screen image 10 can be displayed on the meter display 2.

The vehicular apparatus 1 includes a main controller unit 12, which may also be referred to as a main controller 12. The main controller unit 12 is composed of a so-called microprocessor having a CPU or the like (not shown). The main controller unit 12 controls the vehicular apparatus 1 by executing a computer program stored in the storage unit 13 composed of a non-volatile memory or the like.

Figure 4:
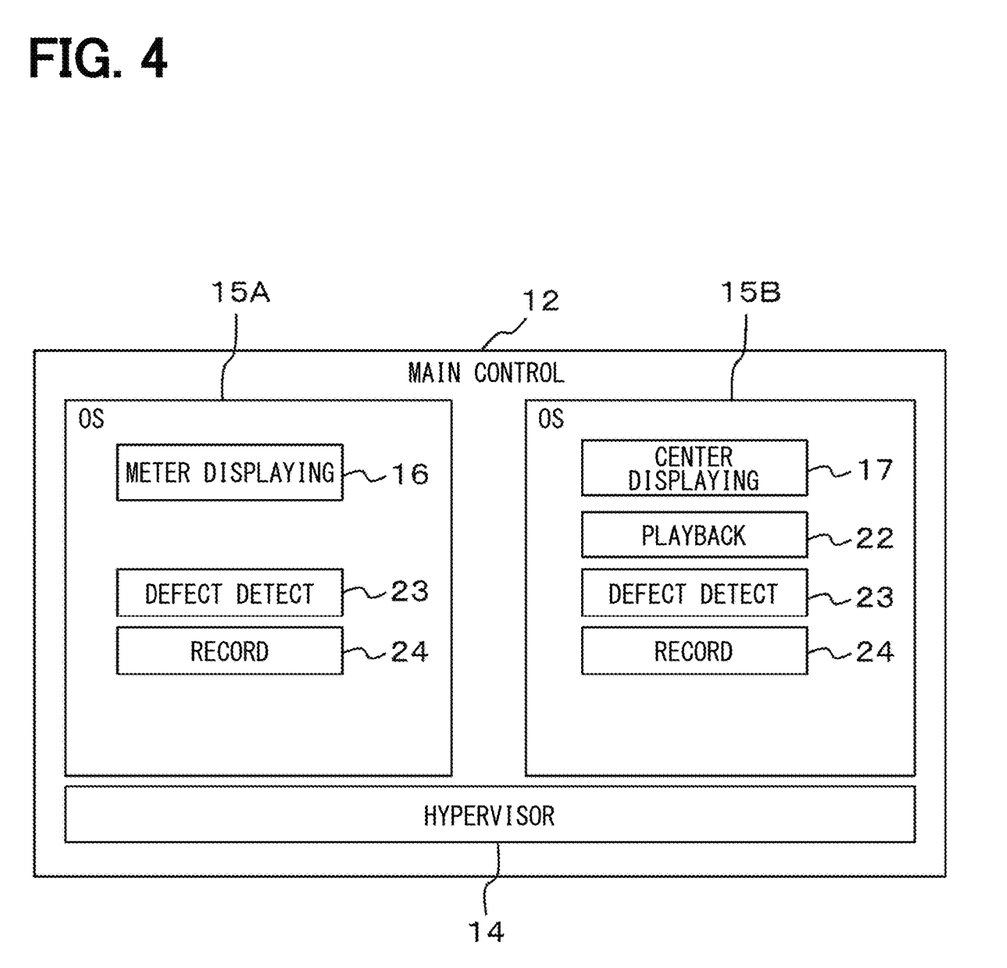
FIG. 4 is a diagram schematically showing a software configuration of a main controller unit.

More specifically, as shown in FIG. 4, the main controller unit 12 is configured to provide a virtual environment in which a hypervisor 14 and two operating systems 15 operating on the hypervisor 14 operate. That is, in the vehicular apparatus 1, a plurality of systems are operating on one hardware. Hereinafter, the operating system 15 will be referred to as an OS 15. For example, when the OS 15A has a hypervisor function, the OS 15B may be operated on the hypervisor function of the OS 15A.

The OS 15A is a so-called real-time OS, and mainly executes a process that requires real-time performance such as a process related to vehicle running or safety, as compared with the OS 15B, for example. In general, such a real-time OS is less likely to cause a problem in the OS 15A itself, and can be considered to have relatively higher stability than a general-purpose OS because it can predict or limit the execution time of an application.

In contrast, the OS 15B is a so-called general-purpose OS. Although its real-time performance is relatively low as compared with the OS 15A, it has an advantage that general-purpose processing such as a so-called multimedia function can be easily executed. Then, the main controller unit 12 controls the overall function of the vehicular apparatus 1 by appropriately executing a program on each OS 15.

Further, as shown in FIGS. 1 and 4, the main controller unit 12 includes a meter displaying unit 16 and a center displaying unit 17. The meter displaying unit 16 is realized by software by a program executed on the main controller unit 12, and generates contents to be displayed on the meter display 2. For example, the meter displaying unit 16 generates content such as information on vehicle running and safety, which is an example.

Information on vehicle driving and safety is required to be displayed promptly and updated appropriately. Therefore, the meter displaying unit 16 is mounted on the OS 15A. The content generated by the meter displaying unit 16 is transmitted to the meter display 2 as drawing data in, for example, LVDS format via the meter displaying circuit 18. The meter displaying circuit 18 corresponds to a controlled device, which is a device controlled by the main controller unit 12.

The center displaying unit 17 is realized by software by a program executed on the main controller unit 12. The center displaying unit 17 generates content to be displayed on the center display 3. The center displaying unit 17 generates multimedia contents such as a navigation screen image 10 and a menu screen image 11. Therefore, the center displaying unit 17 is mounted on the OS 15B.

The content generated by the center displaying unit 17 is transmitted to the center display 3 as drawing data in, for example, LVDS format via the center displaying circuit 19. The center displaying circuit 19 corresponds to a controlled device, which is a device controlled by the main controller unit 12. Further, the center displaying circuit 19 used for realizing the multimedia function corresponds to a target device whose operation is turned off during the cranking period, as will be described later.

Further, the OS 15B is equipped with a multimedia function for playing music, outputting audio to the speaker 4 via the amplifier 20, and playing a television broadcast received by the tuner 21. Therefore, as shown in FIG. 4, a multimedia program such as the playback unit 22 is also executed on the OS 15B.

The amplifier 20 and the tuner 21 correspond to controlled devices controlled by the main controller unit 12. Further, the amplifier 20 and the tuner 21 for realizing the multimedia function correspond to the target device to be turned off during the cranking period, as will be described later. Note that the target device is not limited to the center displaying circuit 19, the amplifier 20, or the tuner 21.

Further, as shown in FIGS. 1 and 4, the main controller unit 12 includes a defect detection unit 23 and a recording unit 24. In the present embodiment, the defect detection unit 23 and the recording unit 24 are provided in each of the OS 15A and the OS 15B. That is, a plurality of OSs 15 that can operate independently are operating in the main controller unit 12, and the defect detection unit 23 and the recording unit 24 are provided in each of the plurality of OSs 15. Since the basic operations of the defect detection unit 23 and the recording unit 24 are common, the same reference numerals are given.

Although the details will be described later, the defect detection unit 23 detects a defect that occurs in the controlled devices controlled by the main controller unit 12. For example, when the device becomes inaccessible or there is no response from the device, the defect detection unit 23 determines that the device has a defect and detects the defect.

When a defect is detected by the defect detection unit 23, the recording unit 24 records defect information that can specify the content of the defect. This defect information is, for example, a so-called diagnosis code. Note that the defect information is not limited to the diagnosis code, and may be any information that can specify the defect that has occurred in the vehicular apparatus 1. The recording unit 24 temporarily records the defect information on the main memory 25, and records it in the non-volatile storage unit 13 at the time of shutdown when the vehicular apparatus 1 ends its operation.

As illustrated in FIG. 1, the vehicular apparatus 1 mounted on the vehicle is supplied with power from the battery 26. In this case, the vehicular apparatus 1 is supplied with power from a path connected to the battery 26 via the fuse 26a and a path via the key switch 26b. Hereinafter, the power supplied from the battery 26 via the fuse 26a is referred to as +B, and the power supplied via the key switch 26b is referred to as IG. In FIG. 1, +B and IG are shown by relatively thick solid lines for the sake of explanation.

The vehicular apparatus 1 includes (i) devices that operate during the cranking period, such as the main controller unit 12, the storage unit 13, and the main memory 25, and (ii) multimedia devices that is turned off during the cranking period, such as the center displaying circuit 19, amplifier 20, and tuner 21. Hereinafter, the former will be referred to as devices of the control system block 27 for convenience, and the latter will be referred to as devices of the MM system block 28 for convenience. The device included in the MM system block 28 corresponds to a target device.

The devices of the control system block 27 and the devices of the MM system block 28 are supplied with power from the main power supply circuit 30 and the auxiliary power supply circuit 31, which are controlled by a power supply controller unit 29. The power supply controller unit 29, which may also be referred to as a power supply controller 29, is configured by a microcomputer separate from the main controller unit 12. The power supply controller unit 29 is activated when predetermined vehicle information for activating the vehicular apparatus 1 such as opening a door is input from an electronic control unit (ECU) 32 mounted on the vehicle. Further, the power supply controller unit 29 mainly controls the power supply circuit. Therefore, the power supply controller unit 29 has a configuration in which the number of tasks to be processed is smaller than that of the main controller unit 12, and the start-up time and responsiveness are high.

The main power supply circuit 30 is connected to the IG and +B; the main power supply circuit 30 has the minimum operating voltage at which power can be supplied is lower than the rated voltage of the battery 26. This minimum operating voltage is set lower than the voltage of the battery 26 during the cranking period in which the current consumption increases to drive the starter motor and the voltage temporarily decreases when the engine is started. Therefore, the main power supply circuit 30 can supply power for each device of the control system block 27 to operate normally even during the cranking period.

In other words, the main power supply circuit 30 has a circuit configuration responding to a low voltage that can cope with a voltage drop of the battery 26 during the cranking period. The rated voltage of the battery 26 can be specified based on the specifications of the battery 26. In addition, at least the minimum value of the voltage during the cranking period can be specified by the specifications of the starter motor, the preliminary test, and the like.

On the other hand, the auxiliary power supply circuit 31 is connected to +B; the auxiliary power supply circuit 31 has the minimum operating voltage at which power can be supplied is higher than that of the main power supply circuit 30. More specifically, the minimum operating voltage of the auxiliary power supply circuit 31 is higher than that of the main power supply circuit 30 and higher than the voltage from the battery 26 during the cranking period.

Therefore, the auxiliary power supply circuit 31 may not be able to supply power to normally operate each device of the MM system block 28 during the cranking period. That is, the auxiliary power supply circuit 31 is configured as a power supply circuit that does not respond to the voltage drop of the battery 26 during the cranking period, in other words, a power supply circuit that does not respond to the low voltage.

The power supply controller unit 29 includes an operation controller unit 33, which controls the start and stop of each of the power supply from the main power supply circuit 30 and the auxiliary power supply circuit 31. The operation controller unit 33, which may also be referred to as an operation controller 33, is realized by software by a program executed on the power supply controller unit 29. The operation controller unit 33 controls the main power supply circuit 30 and the auxiliary power supply circuit 31 based on the voltages of IG and +B detected by the voltage detection circuit 34.

The voltage detection circuit 34 is composed of, for example, a comparator with hysteresis, and outputs a signal for each of IG and +B to be (i) on when each of IG and +B is greater than the set reference voltage and (ii) off when each of IG and +B is equal to or lower than the set reference voltage. Specifically, the operation controller unit 33 operates the main power supply circuit 30 to start power supply when each of the IG and +B is greater than the reference voltage.

Further, when +B is greater than the predetermined reference voltage, the operation controller unit 33 operates the main power supply circuit 30 to start power supply. In other words, the operation controller unit 33 stops the power supply from the auxiliary power supply circuit 31 when +B becomes equal to or lower than the reference voltage. The reference voltage set for the auxiliary power supply circuit 31 corresponds to a predetermined threshold value. That is, when the voltage becomes equal to or lower than the threshold value during the cranking period, the operation controller unit 33 turns off the operation of the target device by stopping the power supply from the auxiliary power supply circuit 31.

Next, the operation of the vehicular apparatus 1 having the above configuration will be described. In the vehicular apparatus 1, even if the main controller unit 12 is operating during the cranking period, the power supply controller unit 29 provided separately from the main controller unit 12 turns off the operation of the target device. Note that in the vehicular apparatus 1, the defect information is recorded by the recording unit 24. Therefore, when the main controller unit 12 is operating during the cranking period, there may be recorded erroneous information that a problem has occurred even though the vehicular apparatus 1 is correctly controlled.

Therefore, the vehicular apparatus 1 prevents erroneously determination of a defect as follows. First, the processes of the operation controller unit 33, the defect detection unit 23, and the recording unit 24 will be described.

Figure 5:
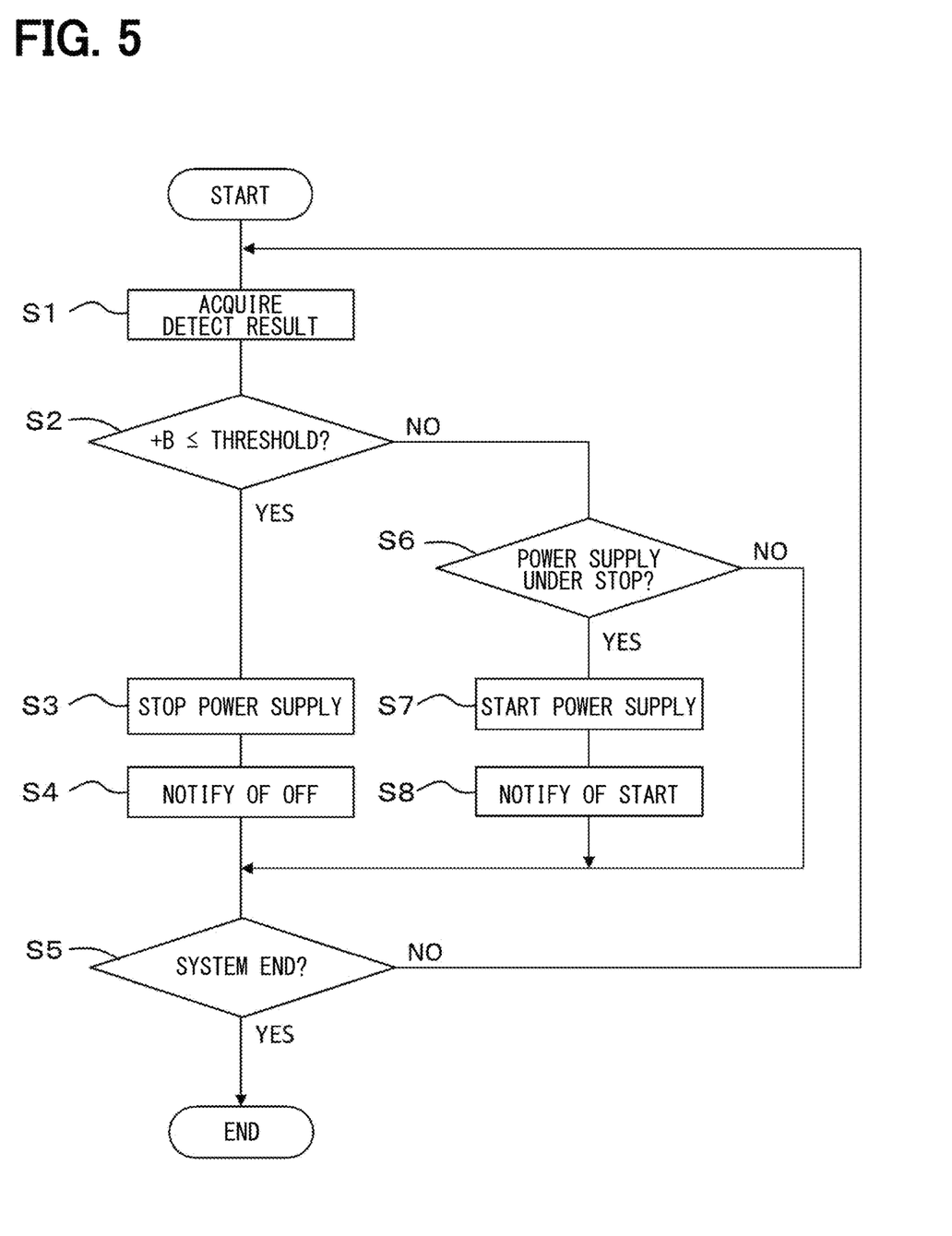
FIG. 5 is a diagram showing a flowchart of a process by an operation controller unit.

When the operation controller unit 33 starts the operation, the operation controller unit 33 executes the process shown in FIG. 5. The operation controller unit 33 controls the operations of the main power supply circuit 30 and the auxiliary power supply circuit 31. FIG. 5 shows a flowchart of controlling the auxiliary power supply circuit 31. In step S1, the operation controller unit 33 acquires the detection result by the voltage detection circuit 34. At this time, the operation controller unit 33 acquires the detection result of whether or not the +B is greater than the reference voltage. In other words, the operation controller unit 33 acquires the detection result of whether or not a voltage drop that falls below the threshold value set in the auxiliary power supply circuit 31 has occurred.

Then, the operation controller unit 33 determines in step S2 whether or not +B is equal to or lower than the threshold value. When +B is equal to or lower than the threshold value, the result becomes YES in step S2. Therefore, in step S3, the operation controller unit 33 stops the power supply from the auxiliary power supply circuit 31. That is, the power supply controller unit 29 turns off the operation of the target device by stopping the power supply from the auxiliary power supply circuit 31.

Then, when the operation of the target device is turned off, the operation controller unit 33 notifies, in step S5, the main controller unit 12 that the operation of the target device is turned off. In this case, the operation controller unit 33 turns off the operation of the target device by a signal that becomes H level when the operation of the target device is turned off and becomes L level when the operation of the target device is not turned off, to thereby notify the main controller unit 12. The operation controller unit 33 can also notify the main controller unit 12, by communication, that the operation of the target device is turned off. As a result, the main controller unit 12 can grasp that the operation of the target device is turned off.

Then, in step S5, the operation controller unit 33 determines whether or not the system end for stopping the operation of the vehicular apparatus 1 comes. If the system end does not come, the result is NO in step S5, so the process proceeds to step S1. That is, the operation controller unit 33 repeatedly executes the process shown in FIG. 5 during the operation of the vehicular apparatus 1. On the other hand, when the system end comes, the operation controller unit 33 ends the process because the result becomes YES in step S5.

On the other hand, when +B is not equal to or lower than the threshold value, the result becomes NO in step S2. Therefore, in step S6, the operation controller unit 33 determines whether or not the power supply is under stop. When +B is greater than the threshold value, and the power supply is under stop, the result becomes YES in step S6. Therefore, the operation controller unit 33 starts the power supply in step S7, and notifies the main controller unit 12 that the power supply is started in step S8.

As a result, for example, when the cranking period ends after the power supply is temporarily stopped during the cranking period, the power supply is restarted. In addition, the main controller unit 12 can grasp that the operation of the target device is turned on. On the other hand, when +B is greater than the threshold value and power is being supplied (i.e., during normal operation), the result becomes NO in step S6. Then, the operation controller unit 33 advances the process to S5.

When the operation controller unit 33 stops or starts the power supply from the auxiliary power supply circuit 31, the operation of the target device is turned off or on, respectively. In this case, the main controller unit 12 is notified of the operating state of the target device.

Figure 6:
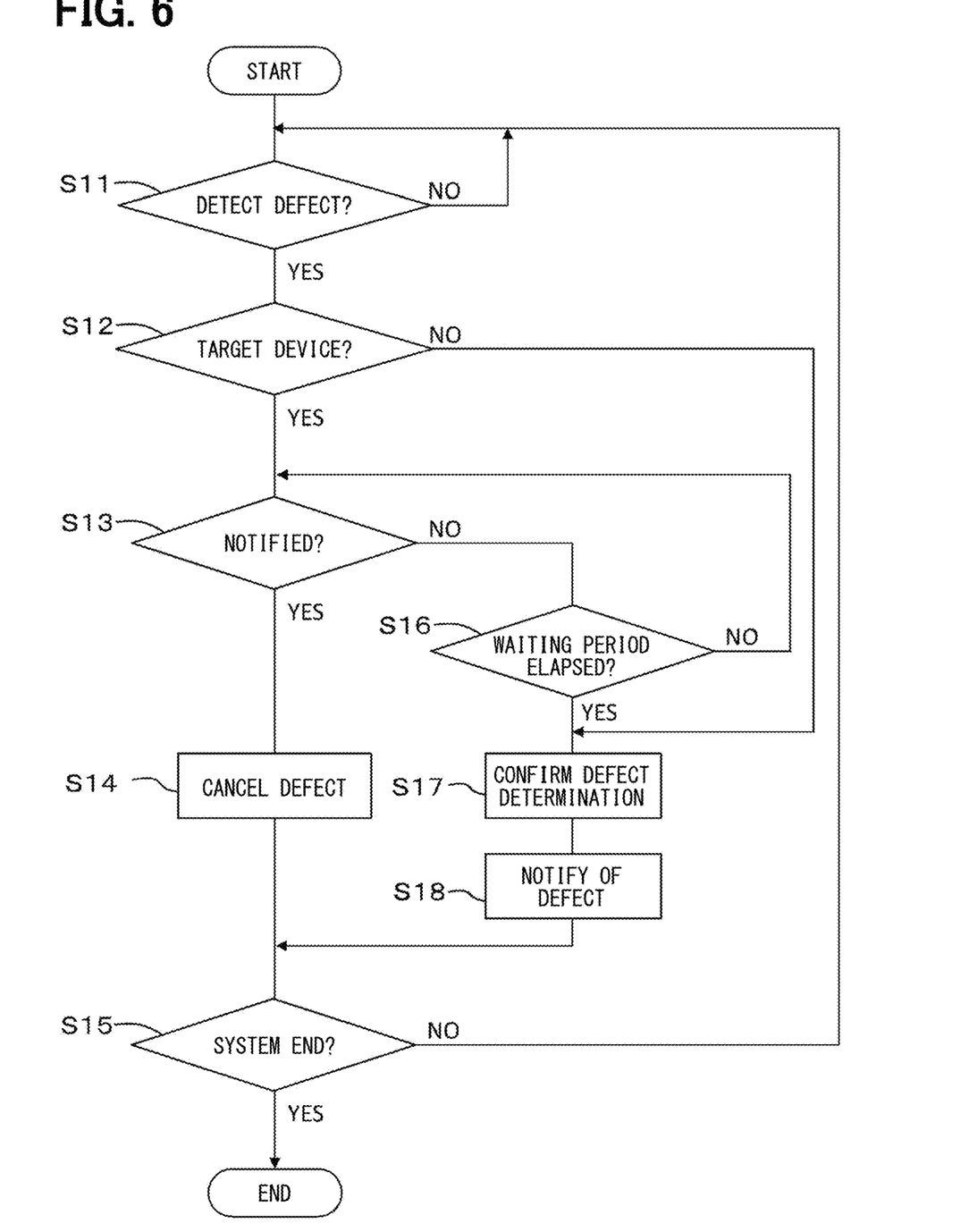
FIG. 6 is a diagram showing a flowchart of a process by a defect detection unit.

By the way, the defect detection unit 23 is executing the process shown in FIG. 6, and in step S11, the defect detection unit 23 determines whether or not the defect is detected. In step S11, the detections of the defects such as whether or not the operation has stopped and whether or not there is a response are made for each device including the target device. When the defect detection unit 23 does not detect a defect, the result becomes NO in step S11, so that the defect detection unit 23 repeats the detection of a defect. That is, the defect detection unit 23 continues to monitor a defect.

On the other hand, when the defect detection unit 23 detects a defect, the result becomes YES in step S11. Therefore, in step S12, it is determined whether or not the device is a target device. When the defect is not detected in the target device, the result becomes YES in step S12. Therefore, in step S17, the defect detection unit 23 determines that there is a defect (i.e., confirms the determination of the defect), and in step S18, the recording unit 24 is notified of a defect. At this time, the defect detection unit 23 notifies the recording unit 24 of the device in which the defect has occurred, or of the content of the defect that has occurred, and the like.

On the other hand, when the defect is detected in the target device, the result becomes YES in step S12. Therefore, in step S13, the defect detection unit 23 determines whether or not there is a notification from the operation controller unit 33. When there is no notification from the operation controller unit 33, the result becomes NO in step S13. The defect detection unit 23 determines in step S16 whether or not a predetermined waiting period of time has elapsed. This waiting period of time is set to be longer than the time required for the operation controller unit 33 to notify of the fact when the voltage drops.

When the defect detection unit 23 determines that the waiting period of time has not elapsed, the result becomes NO in step S16. The process proceeds to step S13 and waits. Then, when the defect detection unit 23 is notified by the operation controller unit 33, the result becomes YES in step S13. Therefore, in step S14, the defect detection unit 23 cancels the determination of the defect with respect to the target device. That is, when the defect detection unit 23 is notified by the operation controller unit 33 within a predetermined waiting period of time after detecting the defect, the defect detection unit 23 considers that the defect is due to a voltage drop and does not determine it as a defect.

Thereafter, the defect detection unit 23 determines in step S15 whether or not the system end comes. When the system end does not come, the result is NO in step S15, so the process proceeds to step S11 and the defect detection is repeated. When the system end comes, the defect detection unit 23 ends the process because the result becomes YES in step S15.

On the other hand, when the waiting period of time has elapsed without notification from the operation controller unit 33, the result becomes YES in step S16. Therefore, in step S17, the defect detection unit 23 confirms the determination of the defect. That is, when the defect detection unit 23 does not receive a notification from the operation controller unit 33 within a predetermined waiting period of time after detecting a defect in the target device, the defect detection unit 23 specifies that some kind of defect has occurred, assuming that it is not due to a voltage drop.

When it is specified that a defect has occurred, the defect detection unit 23 notifies the recording unit 24 of a defect in step S18. At this time, the defect detection unit 23 notifies the recording unit 24 of the target device in which the defect has occurred, the time when the defect has occurred, the content of the defect, and the like.

Figure 7:
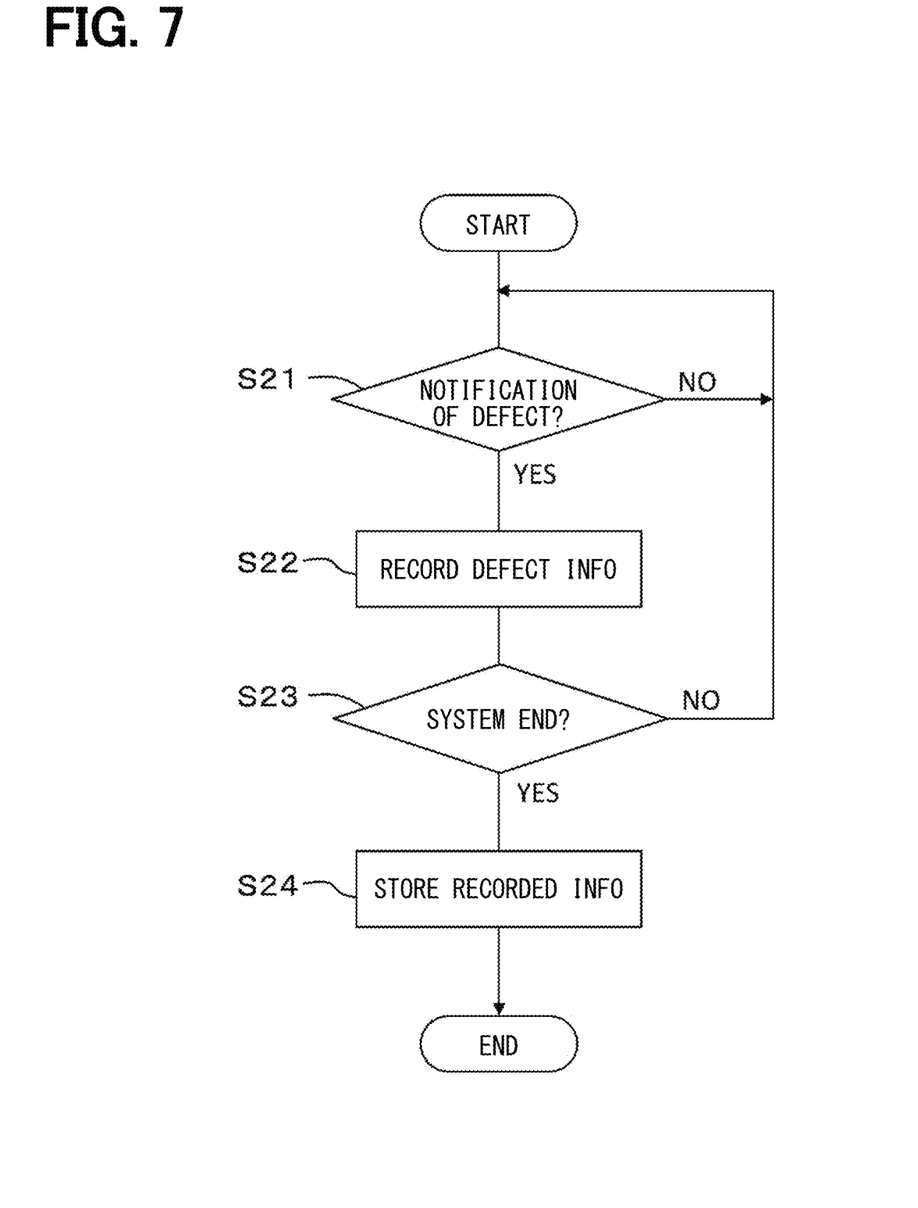
FIG. 7 is a diagram showing a flowchart of a process by a recording unit.

The recording unit 24 is executing the process shown in FIG. 7. In step S21, the recording unit 24 determines whether or not a notification of a defect is received. If the recording unit 24 is not notified of the defect, the result in step S21 becomes NO, so that the recording unit 24 waits for the notification of the defect.

On the other hand, when the recording unit 24 is notified of the defect, the result becomes YES in step S21 so that the recording unit 24 records the defect information in S22. This defect information includes, for example, the target device in which the defect has occurred, the time when the defect has occurred, the content of the defect, and the like reported by the defect detection unit 23.

Then, the recording unit 24 determines in step S24 whether or not the system end comes. When the system end does not come, the result becomes NO in step S23, so the process proceeds to step S21, where the recording unit 24 waits for notification of a defect. On the other hand, when the system end comes, the result becomes YES in step S23 so that the recording unit 24 stores the recorded defect information, and ends the process.

Figure 8:
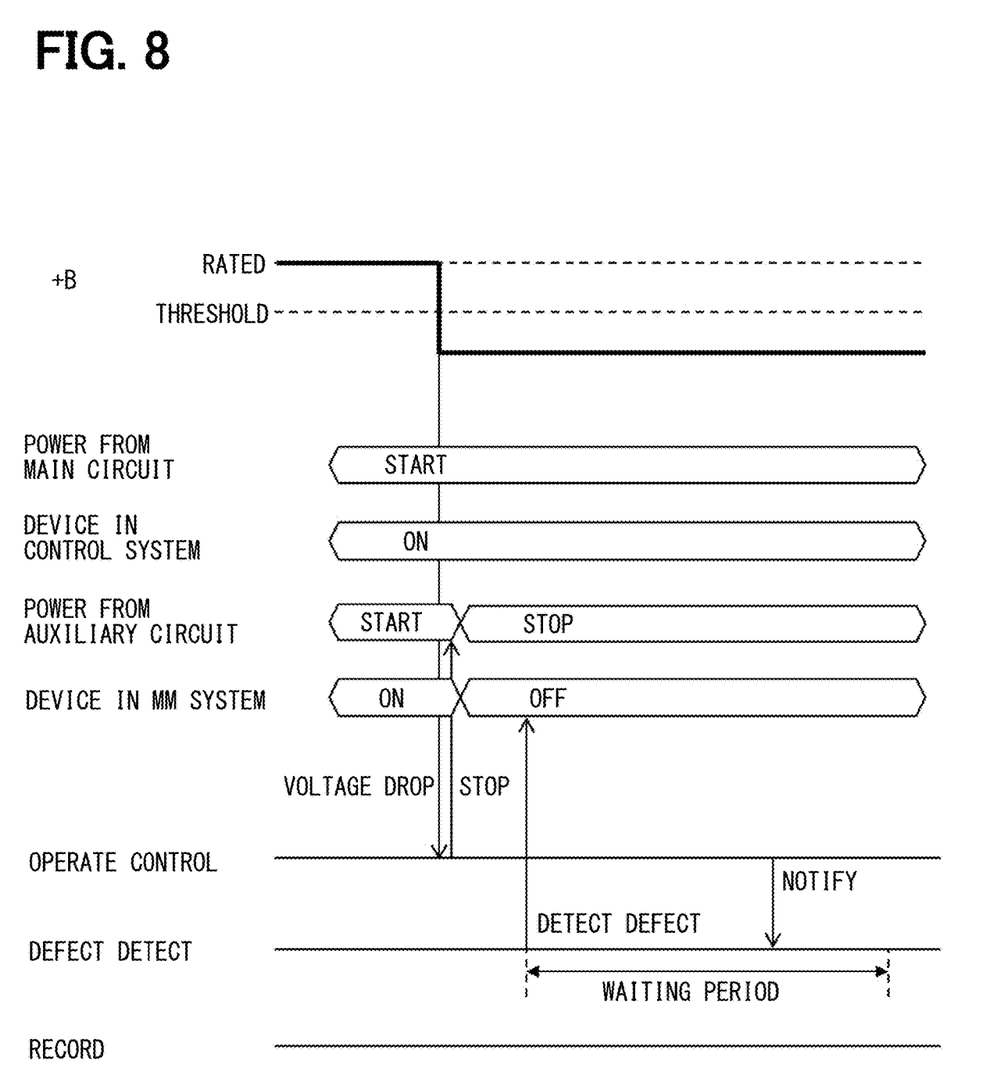
FIG. 8 is a diagram schematically showing an example of operation when the voltage drops.

In this way, in the vehicular apparatus 1, the operation controller unit 33, the defect detection unit 23, and the recording unit 24 cooperate with each other. As a result, as shown in FIG. 8, when a voltage drop below the threshold value occurs in +B, the operation controller unit 33 stops the power supply from the auxiliary power supply circuit 31. As a result, the operation of the target device is turned off, and the defect detection unit 23 temporarily detects it as a defect.

However, if the defect detection unit 23 is notified that the defect is due to a voltage drop within the waiting period of time, the defect detection unit 23 determines that the detected defect is not due to a defect of the target device or the like. The erroneously determination as a defect can thus be prevented. That is, this configuration prevents an erroneous recording of the defect information without notification of an occurrence of the defect to the recording unit 24. This prevents erroneous recording of defect information.

According to the vehicular apparatus 1 described above, the following effects can be obtained. The vehicular apparatus 1 receives power from the battery 26 mounted on the vehicle. The vehicular apparatus 1 includes a main power supply circuit 30, a main controller unit 12, a defect detection unit 23, a recording unit 24, a voltage detection circuit 34, and an operation controller unit 33. The main power supply circuit 30 has a minimum operating voltage that enables power supply; the minimum operating voltage is lower than a rated voltage of the battery 26. The main controller unit 12 is configured to receive the power supply from the main power supply circuit 30. The defect detection unit 23 is configured to detect a defect. The recording unit 24 is configured to record defect information that specifies a content of the defect detected by the defect detection unit 23 in response to the defect detection unit 23 detecting the defect. The voltage detection circuit 34 is configured to detect a voltage from the battery 26. The operation controller unit 33 is configured to control an operation of a target device among a plurality of devices controlled by the main controller unit 12, the target device whose operation is turned off at a voltage drop in response to the voltage from the battery 26 detected by the voltage detection circuit 34 becoming equal to or lower than a predetermined threshold value.

Herein, in response to the operation controller unit 33 turning off the operation of the target device, the operation controller unit 33 is configured to notify the defect detection unit 23 that the operation of the target device is turned off. In response to the defect detection unit 23 being notified by the operation controller unit 33 that the operation of the target device is turned off, the defect detection unit 23 is configured to cancel a determination relative to a defect of the target device, whose operation is turned off by the operation controller unit 33 due to the voltage drop.

By adopting such a configuration, for example, when the voltage of the battery 26 drops during the cranking period and the operation controller unit 33 turns off the operation of the target device, the defect detection unit 23 is notified that the operation of the target device is turned off. Therefore, the defect detection unit 23 can grasp that the cause of the target device not operating is the voltage drop by receiving the notification.

As a result, the defect detection unit 23 can grasp that the defect detected in the target device is the result of correct control as the vehicular apparatus 1. Therefore, it is possible to prevent erroneous determination of a defect.

Further, in the vehicular apparatus 1, the recording unit 24 does not record the defect information when the defect detected by the defect detection unit 23 is due to a voltage drop. As a result, it is possible to prevent erroneous information indicating that a defect has occurred from being recorded.

Further, the defect detection unit 23 is configured to wait until a predetermined waiting period of time elapses after detecting the defect. In response to the defect detection unit 23 being notified by the operation controller unit 33 that the operation of the target device is turned off within the waiting period of time, the defect detection unit 23 is configured to cancel the determination relative to the defect of the target device. As a result, the possibility of erroneously determining a defect can be greatly reduced.

Further, the vehicular apparatus 1 includes an auxiliary power supply circuit 31 having a minimum operating voltage higher than a minimum operating voltage which the main power supply circuit 30 has. Herein, the defect detection unit 23 and the recording unit 24 are configured to receive the power supply from the main power supply circuit 30. The target device is configured to receive a power supply from the auxiliary power supply circuit 31. The voltage detection circuit 34 and the operation controller unit 33 are configured to receive the power supply from the battery 26. The operation controller unit 33 is configured to control a start and a stop of the power supply from the main power supply circuit 30 and to control a start and a stop of the power supply from the auxiliary power supply circuit 31. In response to the voltage from the battery 26 becoming equal to or lower than the threshold value, the operation controller unit 33 is configured to turn off the operation of the target device by stopping the power supply from the auxiliary power supply circuit 31.

Even with such a configuration, it is possible to prevent erroneous determination of a defect, and to prevent erroneous information indicating that a defect has occurred from being recorded. The above-mentioned effects can thus be obtained. Further, when the voltage from the battery 26 drops, the power supply to the target device is stopped. Therefore, even if the voltage from the battery 26 drops, or even if the power supply drops as the voltage drops, the main controller unit 12, the defect detection unit 23, or the recording unit 24 is supplied with the power continuously. Therefore, even during the cranking period, for example, the displaying on the meter can be continued by the main controller unit 12.

Further, the vehicular apparatus 1 includes a power supply controller unit 29 configured to individually control the main power supply circuit 30 and the auxiliary power supply circuit 31. Herein, the operation controller unit 33 is realized by software by a program executed on the power supply controller unit 29. That is, the operation controller unit 33 is provided separately from the main controller unit 12. Even with such a configuration, the main controller unit 12 is notified that the operation of the target device is turned off. As a result, the above-mentioned effects can be obtained, such as preventing erroneous determination of a defect and preventing recording of erroneous information indicating that a defect has occurred.

Further, in the main controller unit 12, a plurality of systems 15A, 15B operate. The defect detection unit 23 and the recording unit 24 are provided in each of the plurality of systems. As a result, even in a virtual environment in which a plurality of systems (i.e., OSs 15) operate, it is possible to prevent erroneous determination of a defect and recording of erroneous information indicating that a defect has occurred.

Second Embodiment

Figure 9:
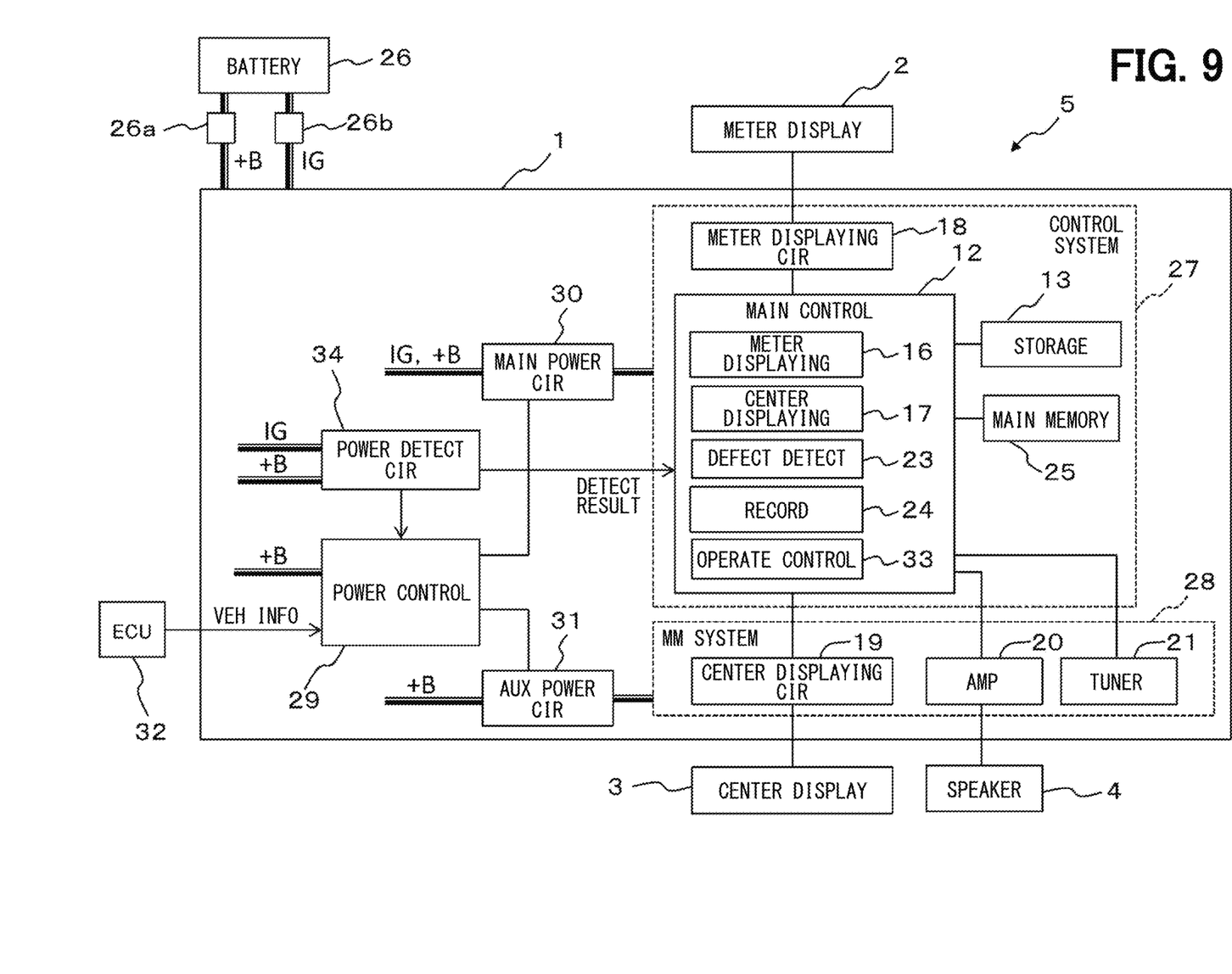
FIG. 9 is a diagram schematically showing a configuration of a vehicular apparatus according to a second embodiment.

Hereinafter, a second embodiment as a modified example or an extended example of the first embodiment will be described. In the first embodiment, the operation controller unit 33 is provided in the power supply controller unit 29, but the operation controller unit 33 can be provided in the main controller unit 12 as shown in FIG. 9. In this case, the voltage detection circuit 34 may notify the main controller unit 12 of the detection result.

Figure 10:
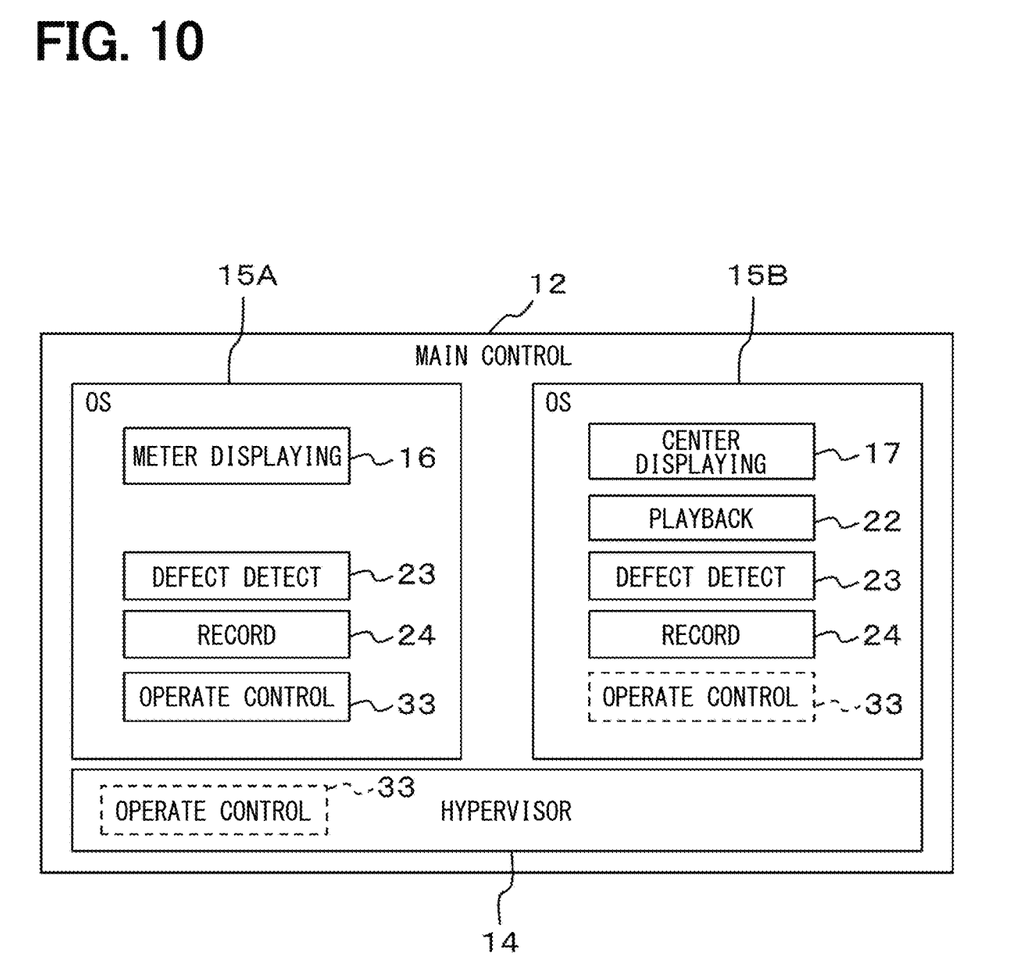
FIG. 10 is a diagram schematically showing a software configuration of a main controller unit.

More specifically, as shown in FIG. 10, for example, the operation controller unit 33 is provided on the OS 15A, which has relatively high stability. As described with reference to FIG. 5 of the first embodiment, the operation of the target device is turned off when +B becomes equal to or less than the threshold value. In this case, the operation controller unit 33 turns off the operation of the target device by stopping at least a part of the functions such as putting the target device in a low power consumption state. It is noted that, as schematically shown by the broken line, the operation controller unit 33 may be provided on the OS 15B as well. Alternatively, as schematically shown by a broken line, the hypervisor 14 may be provided with an operation controller unit 33 to notify each OS 15 that the operation of the target device is turned off.

Then, the operation controller unit 33 notifies the defect detection unit 23 on the OS 15A and the OS 15B that the operation of the target device is turned off. After detecting the defect as described with reference to FIGS. 6 and 7 of the first embodiment, the defect detection unit 23 and the recording unit 24 may be notified that the operation of the target device is turned off by the time when the waiting period of time elapses. In this case, since the defect determination of the target device is canceled, the defect information is not recorded.

In this way, the operation controller unit 33 is realized by software by a program executed on the main controller unit 12, and the operation of the target device is turned off by stopping at least a part of the functions of the target device. The same effect as that of the first embodiment can be obtained, for example, it is possible to prevent erroneous determination as a defect and recording of erroneous information indicating that a defect has occurred.

Figure 11:
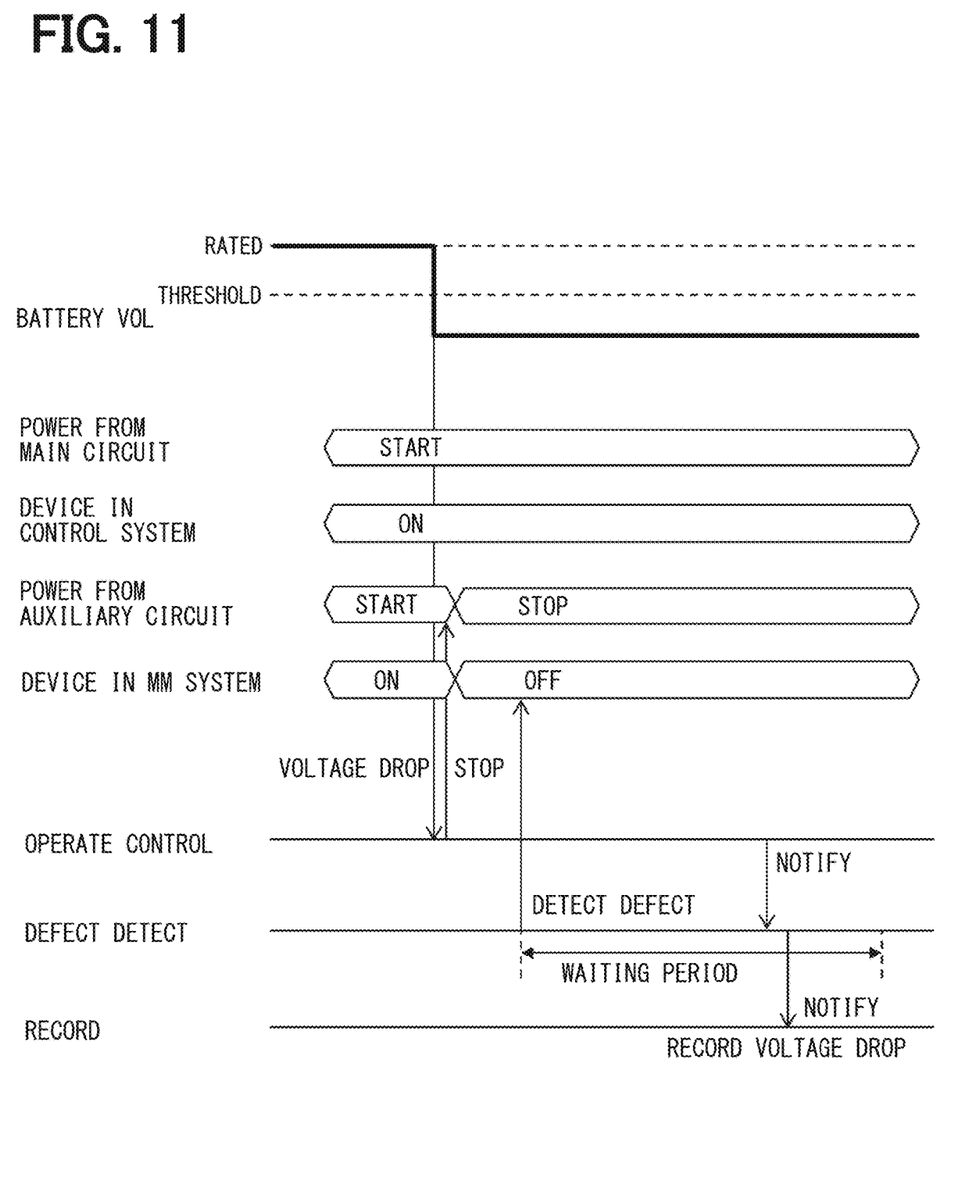
FIG. 11 is a diagram schematically showing an example of operation when the voltage drops.

Further, in the first embodiment, an example is shown in which defect information is not recorded when the operation of the target device is turned off. However, it is possible to record the defect information so that it can be specified that it is due to the voltage drop. For example, as shown in FIG. 11, when a voltage drop below the threshold value occurs in +B, the operation of the target device is turned off by the operation controller unit 33.

As a result, the defect detection unit 23 once detects a defect. However, if it is notified within the waiting period of time that it is due to a voltage drop, it is determined that the detected defect is due to the voltage drop. That is, it is prevented that it is erroneously determined as a defect. Then, the defect detection unit 23 notifies the recording unit 24 that the detected defect is due to a voltage drop.

As a result, the recording unit 24 records the defect information so that it can be specified that the voltage drop has occurred. Since the defect information records that a voltage drop has occurred, erroneous determination that a defect has occurred during analysis can be prevented from occurring. That is, it is possible to prevent erroneous information indicating that a defect has occurred from being recorded.

Although the present disclosure has been described in accordance with embodiments, it is understood that the present disclosure is not limited to such embodiments or structures. The present disclosure also includes various modifications and modifications within an equivalent range. In addition, various combinations and forms, and further, other combinations and forms including only one element, or more or less than these elements are also within the sprit and the scope of the present disclosure.

The present disclosure has described the main controller unit 12, the power supply controller unit 29, and the operation controller unit 33, each of which may be configured as a controller. Some or all of the controllers may be combined as one controller. The controller and method described in the present disclosure in the above embodiment may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits. The computer programs may be stored, as instructions to be executed by a computer, in a tangible non-transitory computer-readable storage medium.

For reference to further explain features of the present disclosure, the description is added as follows.

There is recently a vehicular apparatus for displaying information by arranging a display inside a meter in a vehicle, or replacing the entire meter with a display to display graphically the speed and the like. There is also a vehicular apparatus provided with a display for displaying so-called multimedia information such as a navigation window. Further, there is disclosed a vehicular apparatus that integrates a plurality of functions such as displaying the meter and displaying the multimedia information. Hereinafter, a vehicular apparatus integrating a plurality of functions will be referred to as an integrated vehicular apparatus for convenience.

The vehicular apparatus is supplied with power from a battery mounted on the vehicle. It is known that such a battery provides a voltage that becomes temporarily lower than the rated voltage because the current consumption increases to drive the starter motor when the engine is started. Hereinafter, the period during which the voltage from the battery temporarily drops is referred to as a cranking period.

Therefore, the integrated vehicular apparatus is provided with a power supply circuit responding to the low voltage that can supply power even during the cranking period. At the same time, the integrated vehicular apparatus turns off the operation of peripheral circuits such as amplifiers in a multimedia system, which do not necessarily need to operate during the cranking period. As a result, the integrated vehicular apparatus can supply power to the main controller unit that controls the displayed images on the meter even during the cranking period. The operation on the main controller unit can thus be continued.

However, it has become clear that integrating multiple functions may involve a new problem that were not expected when each function is controlled by an individual apparatus.

That is, in the integrated vehicular apparatus, a peripheral circuit of the multimedia system is also controlled by the main controller unit during normal operation. Suppose a case where the peripheral circuit of the multimedia system is turned off during the cranking period. In such a case, the operation of the peripheral circuit of the multimedia system is turned off although the main controller unit is operating. As a result, the main controller unit may erroneously detect that a defect has occurred in the peripheral circuit of the multimedia system because the response of the peripheral circuit of the multimedia system is lost.

Then, in a general vehicular apparatus, when a defect is detected, information for failure diagnosis, which is a so-called diagnosis code, is recorded. Further, during the cranking period, the main controller unit, which is the main body for detecting the defect, continues to operate. As described above, such a control for turning off an operation of a target device due to the drop of the voltage from the battery is a correct control. However, even though the correct control was performed, the vehicular apparatus may record incorrect information that a defect has occurred. It is thus desired to provide a vehicular apparatus capable of preventing an erroneous determination of a defect.

An aspect of the present disclosure described herein is set forth in the following clauses.

According to an aspect of the present disclosure, a vehicular apparatus is provided to receive power from a battery mounted on a vehicle. The vehicular apparatus includes a main power supply circuit, a main controller unit, a defect detection unit, a recording unit, a voltage detection circuit, and an operation controller unit. The main power supply circuit has a minimum operating voltage that enables power supply; the minimum operating voltage is lower than a rated voltage of the battery. The main controller unit is configured to receive the power supply from the main power supply circuit. The defect detection unit is configured to detect a defect. The recording unit is configured to record defect information that specifies a content of the defect detected by the defect detection unit in response to the defect detection unit detecting the defect. The voltage detection circuit is configured to detect a voltage from the battery. The operation controller unit is configured to control an operation of a target device among a plurality of devices controlled by the main controller unit, the target device whose operation is turned off at a voltage drop in response to the voltage from the battery detected by the voltage detection circuit becoming equal to or lower than a predetermined threshold value.

Herein, in response to the operation controller unit turning off the operation of the target device, the operation controller unit is configured to notify the defect detection unit that the operation of the target device is turned off. In response to the defect detection unit being notified by the operation controller unit that the operation of the target device is turned off, the defect detection unit is configured to cancel a determination relative to a defect of the target device. The above configuration makes it possible to prevent erroneous determination of a defect.

What is claimed is:

1. A vehicular apparatus that receives power from a battery mounted on a vehicle, comprising:
   a main power supply circuit, of which a minimum operating voltage that enables power supply is lower than a rated voltage of the battery;
   a main controller configured to receive the power supply from the main power supply circuit;
   a defect detection unit configured to detect a defect;
   a recording unit configured to record defect information that specifies a content of the defect detected by the defect detection unit in response to the defect detection unit detecting the defect;
   a voltage detection circuit configured to detect a voltage from the battery;
   an operation controller configured to control an operation of a target device among a plurality of devices controlled by the main controller, the target device of which an operation is turned off at a voltage drop in response to the voltage from the battery detected by the voltage detection circuit becoming equal to or lower than a predetermined threshold value; and
   an auxiliary power supply circuit having a minimum operating voltage higher than a minimum operating voltage which the main power supply circuit has,
   wherein:
   in response to the operation controller turning off the operation of the target device, the operation controller is configured to notify the defect detection unit that the operation of the target device is turned off;
   in response to the defect detection unit being notified by the operation controller that the operation of the target device is turned off, the defect detection unit is configured to cancel a determination of the defect relative to the target device;
   the defect detection unit and the recording unit are electrically connected to the main power supply circuit;
   the target device is electrically connected to the auxiliary power supply circuit;
   the voltage detection circuit and the operation controller are configured to receive the power supply from the battery;
   the operation controller is configured to control a start and a stop of the power supply from the main power supply circuit and to control a start and a stop of the power supply from the auxiliary power supply circuit; and
   in response to the voltage from the battery becoming equal to or lower than the threshold value, the operation controller is configured to turn off the operation of the target device by stopping the power supply from the auxiliary power supply circuit.

2. The vehicular apparatus according to claim 1, wherein:
   in response to the defect detected by the defect detection unit being due to the voltage drop, the recording unit is configured (i) to prevent recording the defect information or (ii) to record the defect information to be enabled to specify the defect due to the voltage drop.

3. The vehicular apparatus according to claim 1, wherein:
   the defect detection unit is configured to wait until a predetermined waiting period of time elapses after detecting the defect; and
   in response to the defect detection unit being notified by the operation controller that the operation of the target device is turned off within the waiting period of time, the defect detection unit is configured to cancel the determination of the defect relative to the target device.

4. The vehicular apparatus according to claim 1, further comprising:
   a power supply controller configured to individually control the main power supply circuit and the auxiliary power supply circuit,
   wherein:
   the operation controller is realized by software by a program executed on the power supply controller.

5. The vehicular apparatus according to claim 1, wherein:
   the operation controller is realized by software by a program executed on the main controller; and
   the operation controller is configured to turn off the operation of the target device by stopping at least partially a function of the target device.

6. The vehicular apparatus according to claim 1, wherein:
   in the main controller, a plurality of systems operate; and
   the defect detection unit and the recording unit are provided in each of the plurality of systems.

7. A vehicular apparatus that receives power from a battery mounted on a vehicle, comprising:
   a main power supply circuit, of which a minimum operating voltage that enables power supply is lower than a rated voltage of the battery;
   a main controller configured to
     receive the power supply from the main power supply circuit,
     detect a defect, and
     record defect information that specifies a content of the detected defect in response to detecting the defect;
   a voltage detection circuit configured to detect a voltage from the battery;
   an operation controller configured to control an operation of a target device among a plurality of devices controlled by the main controller, the target device of which an operation is turned off at a voltage drop in response to the voltage from the battery detected by the voltage detection circuit becoming equal to or lower than a predetermined threshold value; and an auxiliary power supply circuit having a minimum operating voltage higher than a minimum operating voltage which the main power supply circuit has, wherein:

in response to the operation controller turning off the operation of the target device, the operation controller is configured to notify the main controller that the operation of the target device is turned off;

in response to the main controller being notified by the operation controller that the operation of the target device is turned off, the main controller is configured to cancel a determination of the defect relative to the target device;

the main controller is electrically connected to the main power supply circuit;

the target device is electrically connected to the auxiliary power supply circuit;

the voltage detection circuit and the operation controller are configured to receive the power supply from the battery;

the operation controller is configured to control a start and a stop of the power supply from the main power supply circuit and to control a start and a stop of the power supply from the auxiliary power supply circuit; and in response to the voltage from the battery becoming equal to or lower than the threshold value, the operation controller is configured to turn off the operation of the target device by stopping the power supply from the auxiliary power supply circuit.

* * * * *